Figure 1:
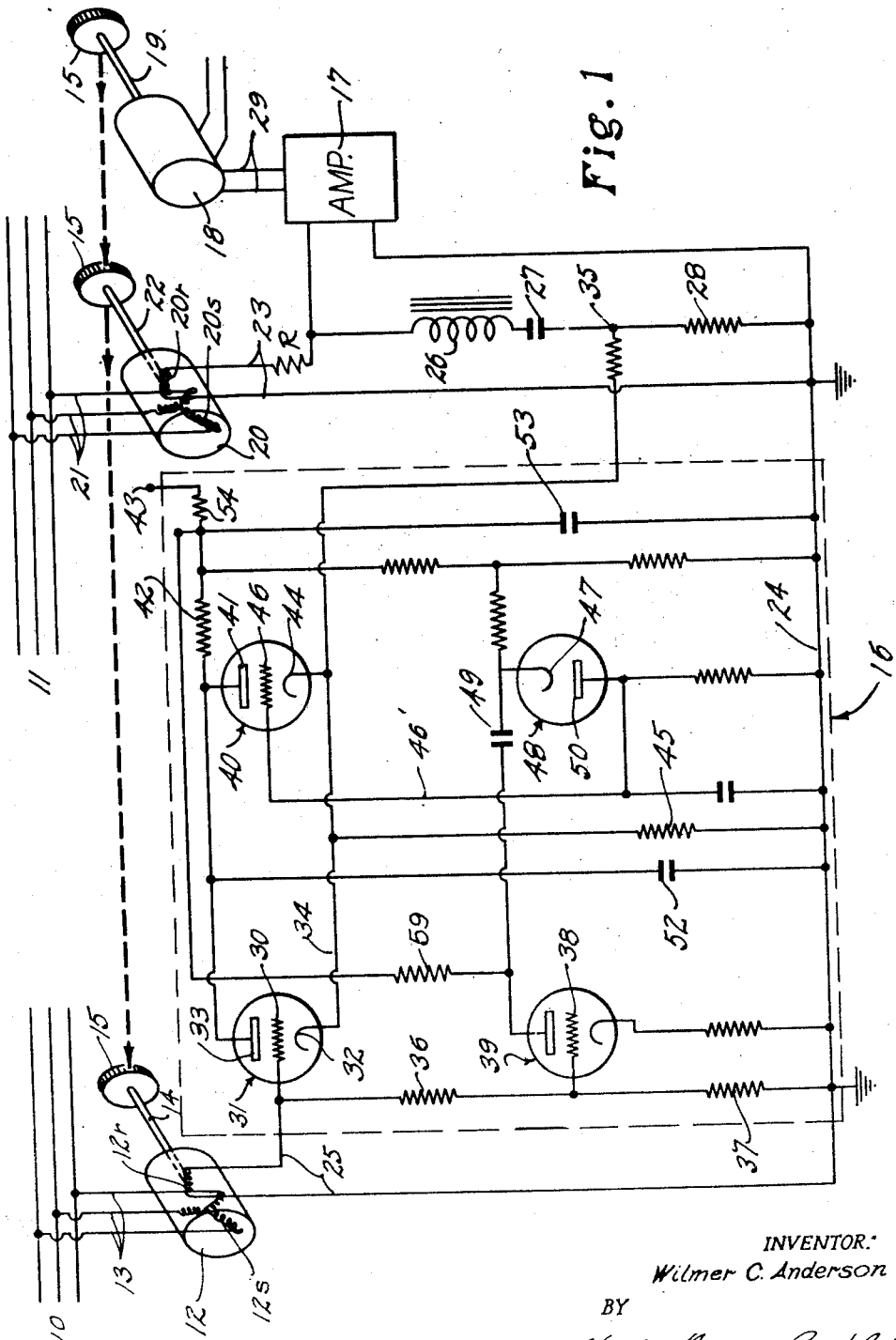

March 21, 1950  W. C. ANDERSON  2,501,300
SERVO SYSTEM CONTROL
Filed Jan. 22, 1946  2 Sheets-Sheet 1

INVENTOR.
Wilmer C. Anderson
BY
ATTORNEYS

March 21, 1950  W. C. ANDERSON  2,501,300
SERVO SYSTEM CONTROL
Filed Jan. 22, 1946  2 Sheets-Sheet 2

INVENTOR:
Wilmer C. Anderson
BY
Hoguet, Neave & Campbell
ATTORNEYS

Patented Mar. 21, 1950

2,501,300

UNITED STATES PATENT OFFICE 2,501,300

SERVO-SYSTEM CONTROL

Wilmer C. Anderson, Douglaston, N. Y., assignor to Arma Corporation, Brooklyn, N. Y., a corporation of New York Application January 22, 1946, Serial No. 642,709

11 Claims. (Cl. 318—30)

This invention relates to electromechanical servo-systems, and has particular reference to an improved means of shifting automatically from precision control of such a servo-system to standby or rough synchronism control, and vice versa.

Modern servo-systems are generally of the self-synchronous electronic amplifier type, in which the signal or variable to be followed and reproduced mechanically is transmitted to the remote servo-motor position in duplicate over the usual six bus wires of the space-phased self-synchronous transmission system. The low-speed or synchronizing signal is fed into the three-phase stator winding of a self-synchronous "control transformer" having a "null" winding on its rotor for generating an error voltage when in inductive angular relation to the stator core receiving the signal. The rotor is mechanically driven by the response of the servo-motor to the error voltage of the null coil when the low speed signal is in control, so that the rotor is kept near zero-induced voltage position and rough following of the signal is thus obtained by the servo-motor. However, such reproduction is not accurate and it is customary to use such a low speed control only as a standby when the associated high-speed control transformer has lost synchronism. Normally, the high-speed control transformer is guiding the servo-motor to maintain alignment with the high speed signal arriving on the high-speed wire of the self-synchronous buses, which has increased accuracy proportional to its speed ratio to the actual signal but, since it can become permanently unsynchronized with its signal, the standby or low-speed system is incorporated. It is highly desirable that shift from high speed to low speed control is effected automatically, such as by a shift relay responsive to asynchronism, an example of said system being described in copending application Serial No. 626,406, filed November 2, 1945, by Frederick W. Cunningham, now Patent Number 2,444,813, issued July 6, 1948.

In accordance with the present invention, an automatic shift control electromechanical servo-system is provided which differs from previous arrangements in that it is purely electronic and has no moving parts. A preferred embodiment of the invention comprises an electromechanical servo-system having at least two similar control means for producing error voltages which measure the degree of loss of synchronism of the system, adapted alternatively to control a servo-motor provided with an electronic relay means for shifting control from one to another of said control means when the error voltage produced by one of said control means exceeds a predetermined value as a result of another of said control means losing synchronism while controlling said servo-system, such relay means comprising a normally blocked electronic valve having a grid connected to said one control means and a cathode connected to said servo-motor for controlling the same, and electronic means for said normally blocked valve operative to unblock said valve upon increase of the error voltage impressed on said grid above a predetermined value, thereby placing said one control means in control of the servo-motor until synchronism is regained. In an alternative arrangement of the invention, a snap-action shift in control of the electronic relay is obtained at a predetermined time, before material signal asynchronism occurs.

It will be seen that the present invention provides a reliable and quick-acting electronic control device for shifting control of a servo-motor from high-speed or precision control to low-speed or standby control.

For a more complete understanding of the invention, reference may be had to the accompanying drawings, in which:-

Figure 2:
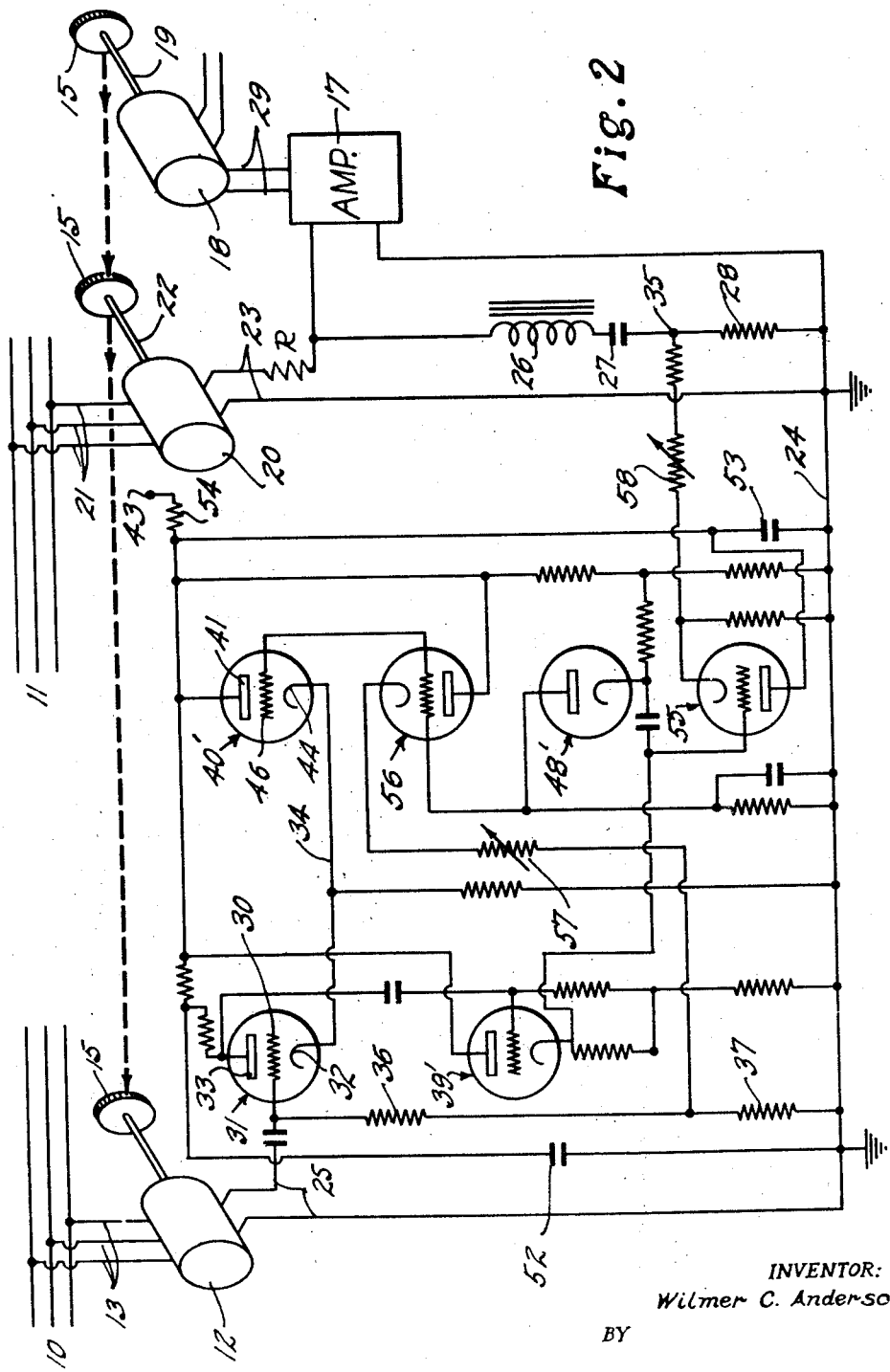

Figure 1 is a combination electrical and mechanical diagram of the arrangement of one form of the invention to shift control in an electronic follow-up from precision control to standby control and vice versa; and, Fig. 2 is a similar diagram of a modification of the invention, arranged for an abrupt shifting action.

Referring to Fig. 1, numeral 10 designates the three-wire bus over which the low speed standby or synchronizing signal arrives, and numeral 11 designates the corresponding bus for the high speed or precision signal, both leading from the corresponding remote transmitters, not shown. The low speed synchronizing control transformer 12 has its stator windings 12s connected by wires 13 to bus 10 so as to be supplied with the usual space-phased currents to produce a field orientation representing the remote demand or signal. The corresponding rotor is driven by the shaft 14 of the control transformer within the stator field and carries the usual null coil 12r in which error voltages are induced whenever that coil is in angularly inductive relation to the stator winding 12s. The error voltage induced in the null rotor coil 12r is fed through the electronic system 16, comprising a preferred form of this invention to be described, and thence on to the conventional electronic power amplifier 17, which energizes the servo-motor 18 for mechanical reproduction of input signals, in the well-known manner. The shaft 19 of the servo-motor 18 is connected by gearing 15 to the rotor shaft 14 of the low-speed control transformer 12 and to the rotor shaft 22 of the high-speed control transformer 20. Proper speed ratios are of course provided.

In like manner, the stator 20s of high speed or precision control transformer 20 is connected by wires 21 to the high speed bus 11 and the rotor with its null coil 20r is kept substantially crosswise in the resultant signal field by the connection of its shaft 22 to gearing 15 of the servo-motor 18, as shown. By such an arrangement, control of the servo-motor 18 may be effected either by the high-speed or precision control-transformer 20, or by the synchronizing or standby control-transformer 12, shift from one type of control to the other being made by the suitable means to be described.

Ordinarily, the precision or high-speed transmission from bus 11 is in control during practically all of the time that the servo-system is in use, the signal or order to be reproduced feeding from the bus 11 through wires 21 to the stator winding 20s of the control transformer 20. Error due to misalignment of the servo-motor shaft 19, and therefore of the control transformer rotor 20r and its shaft 22, appears as a voltage across the rotor coil output leads 23, one of which is grounded at 24 and the other of which feeds to the aforementioned power amplifier 17. Connected across this input at 23 is the usual damping circuit comprising, for example, the resistance R, the choke 26, the condenser 27, and the resistance 28 in series and to ground. The power amplifier 17 is connected by leads 29 to servo-motor 18, as shown, and thus a practical and accurate single speed servo-system is provided, or the high speed portion of a high and low-speed system, as thus far described.

The improvement of the present invention resides in the control of the standby or low-speed control mechanism including transformer 12, which rotates with the high-speed unit 20 and also develops error voltages when misalignment occurs in the normal non-inductive angular relation of rotor 12r with stator 12s. Such error voltages are applied by wires 25 between ground 24 and the grid 30 of the electronic vacuum tube 31, which may be type 6SL7. At the same time, a shunt comprising resistances 36 and 37 is bridged across grid 30 and ground 24, and the grid 38 of vacuum tube 39 is connected between these two resistances 36 and 37.

Vacuum tube 31 is a cathode follower such as is described on pages 164–174 of Reich's "Theory and Application of Electron Tubes" (second edition), published 1944 by McGraw-Hill Co., in that voltages appear on its cathode 32 proportional to those on its grid 30, and such voltages are passed along the lead 34 to the terminal 35 of the resistance 28 to control the power amplifier 17 when the system is in standby operation. However, tube 31 is normally blocked by a tube 40, having a higher trans-conductance and a more remote cutoff point, such as the type 6SN7, with its plate 41 connected to the plate 33 of tube 31 and, through resistances 42 and 54 to the 300 volt direct current source 43.

Cathode 44 of tube 40 is also connected to the cathode 32 of tube 31 by the lead 34 and between the two cathodes 32 and 44 a connection to ground wire 24 is made through a resistance 45. The grid 46 of the tube 40 is biased, by connection 46' to the plate 50 of the diode 48, so that enough current flows through tube 40 and resistance 45 to place on grid 30 and cathode 32 of tube 31 a voltage sufficient to block tube 31 entirely, as previously mentioned. This condition persists as long as the error voltages on grid 30 from the rotor coil 12r of control transformer 12 are small, due to accurate high-speed following by control-transformer 20, which accordingly feeds its error voltage along leads 23 to amplifier 17 driving servo-motor 18.

However, should this control by high-speed control transformer 20 fail for any reason, then the resulting lag of the servo-motor 18 would be communicated to the control-transformer 12 by reason of the direct drive through gearing 15, thus causing rotor 12r to lag so that its output error voltage to grid 30 would greatly increase, thereby tending to bring the tube 31 back toward operating condition. At the same time, grid 38 of tube 39 is affected, causing the voltage drop in plate resistor 59 which is applied through condenser 49 to cathode 47 of diode 48 to increase. Diode 48 therefore becomes conductive so that the cathode 47 current thereby causes connected grid 46 of tube 40 to be biased so that tube 40 becomes inactive. The blocking voltage therefore afforded by tube 40 is accordingly removed from cathode 32 of tube 31 and the tube thereafter functions as a simple cathode follower for low-speed control transformer 12, through point 35 to amplifier 17 and servo-motor 18. Finally, when control-transformer 12 is again following accurately, the error voltage applied by it to grid 30 decreases, and the whole process described above occurs in reverse and control is returned to high-speed control transformer 20 for normal operation.

It is evident that when control transformer 12 is in control and, by means of tube 31, is applying voltages across the resistance 28, the high-speed control transformer 20 is also applying voltages by the leads 23, sometimes with and sometimes against the signals from low-speed control transformer 12. However, since the control, in such a case, is merely required to retain synchronism, the variation so caused is of no importance, because the voltage drop ($E=IR$), across high resistance R limits the magnitude of the input voltage applied to amplifier 17 by control transformer 20, while the large value of voltage applied across relatively low resistance 28 when control transformer 12 is in control, completely dominates said input voltage. On the other hand, when the unit 20 is in control and accurately following the remote signal, unit 12 is actually completely blocked out of circuit and unit 20 is therefore in sole accurate control. In other words, the unit 12 assumes control by overcoming the signals from unit 20 when it loses synchronism with the remote signal by a predetermined amount. De-coupling condensers are provided at 52 and 53 which act together with resistances 42 and 54 as an attenuator network to prevent the passage of parasitic signals from unit 16 to unit 17 and vice versa.

In certain special servo-systems, a more abrupt change-over is desirable and may be obtained by the arrangement of Fig. 2, which is like that of Fig. 1, as indicated by the same reference characters, with additional vacuum tubes and a different mode of inter-connection. Thus, tube 39' is a cathode follower, and is used to prevent loading of tube 31 by diode tube 48'. Tube 55 is another cathode follower used to isolate the transfer circuit from any voltage that might be introduced through the output leads from the high-speed control transformer 20, whereas tube 56 is a biasing tube for the grid 30 of tube 31.

In operation of the arrangement of Fig. 2, tube 31 is biased beyond cut-off with the cathode current from tube 40' when not receiving a signal, so that no voltage is applied to the grids of either tube 39' or tube 55. When the signal from unit 12 reaches a predetermined level, tube 31 will start to amplify, the amplified signal will be passed through the diode 48' and used to bias tube 40' towards cut-off. As this occurs, the operating point of tube 31 is displaced in a positive direction, with accompanying increase in gain, i. e., a regenerative process which continues until tube 40' is completely cut off and tube 31 is in control as a high-gain class A amplifier.

Conversely, when the signal decreases, the action is reversed, and a slight drag-loop effect is introduced by the failure of the circuit to start and stop at precisely the same signal level. This effect is reduced to a minimum by means of tube 56 which, at no signal input, places a slight positive bias on the grid 30 of tube 31, but not enough to bring it above the cut-off point. As soon as the regenerative action described above has taken place and tube 31 is conducting, tube 56 is biased to cut-off by the same process as tube 40' and thus tube 31 will cut off sooner when the signal decreases. By adjusting the constants of the circuit, as by means of variable resistances 57 and 58, the drag-loop effect may be reduced as much as desired and thus an abrupt snap-action of the device obtained, at a desired predetermined position.

Although certain preferred embodiments of the invention have been illustrated and described herein, it is to be understood that the invention is not limited thereby but is susceptible of changes in form and detail within the scope of the appended claims.

I claim:

1. In an electromechanical servo-system having a servo-motor alternatively responsive to signals from remote high and low speed transmitters, the combination of a pair of control transformers having stator windings severally connected to said transmitters and corresponding rotor windings for generating an error voltage upon displacement thereof from non-inductive relation with the corresponding stator winding, operative connections between the servo-motor and said rotor windings for driving the latter toward non-inductive relation with the corresponding stator windings, electrical connections between said rotor windings and said servo-motor, and means for shifting control of said servo-motor from one transformer to the other upon loss of a predetermined degree of synchronism between said servo-motor and the transmitter corresponding to said one transformer, said means including an electronic valve interposed between the rotor winding of said other transformer and said servo-motor and having one electrode connected to the rotor winding of said other transformer for receiving voltage impulses therefrom and another electrode connected to energize the servo-motor, and electrical means connected to said electronic valve for applying a predetermined blocking voltage thereto, an electrical connection between said rotor winding and said blocking means whereby an error voltage induced in the rotor winding of said other transformer disables said blocking means through the said electrical connection to enable said other transformer to assume control of said servo-motor.

2. In an electromechanical servo-system having a servo-motor alternatively responsive to signals from remote high and low speed transmitters, the combination of a pair of control transformers having stator windings severally connected to said transmitters and corresponding rotor windings for generating an error voltage upon displacement thereof from non-inductive relation with the corresponding stator winding, operative connections between the servo-motor and said rotor windings for driving the latter toward non-inductive relation with the corresponding stator windings, electrical connections between said rotor windings and said servo-motor, and means for shifting control of said servo-motor from one transformer to the other upon loss of a predetermined degree of synchronism between said servo-motor and the transmitter corresponding to said one transformer, said means including an electronic valve interposed between the rotor winding of said other transformer and said servo-motor and having one electrode connected to the rotor winding of said other transformer for receiving voltage impulses therefrom and another electrode connected to the servo-motor, the said connection being operable to convey voltage impulses to said servo-motor, a second electronic valve applying a predetermined biasing voltage across electrodes of said first valve to thereby normally block control of said servo-motor by said first valve, and connections between said second valve and the rotor winding of said other transformer, whereby the blocking action of said second valve is nullified upon induction in said last-named rotor winding of a voltage at least equal to said predetermined voltage to enable said other transformer to assume control of said servo-motor.

3. In an electromechanical servo-system having a servo-motor alternatively responsive to signals from remote high and low speed transmitters, the combination of a pair of control transformers having stator windings severally connected to said transmitters and corresponding rotor windings for generating an error voltage upon displacement thereof from non-inductive relation with the corresponding stator winding, operative connections between the servo-motor and said rotor windings for driving the latter toward non-inductive relation with the corresponding stator windings, electrical connections between said rotor windings and said servo-motor, and means for shifting control of said servo-motor from one transformer to the other upon loss of a predetermined degree of synchronism between said servo-motor and the transmitter corresponding to said one transformer, said means including an electronic valve interposed between the rotor winding of said other transformer and said servo-motor and having its grid connected to the rotor winding of said other transformer for receiving voltage impulses therefrom and its cathode connected to energize the servo-motor, a second electronic valve having its cathode interposed between the cathode of said first valve and said servo-motor, a source of power connected to the anodes of said valves, and means biasing the grid of said second valve to cause application of a predetermined blocking voltage to the said first valve to block the same, whereby induction of an error voltage in the rotor winding of said second transformer of sufficient magnitude to unblock said first valve enables said second transformer to assume control of said motor.

4. In an electromechanical servo-system having a servo-motor alternatively responsive to signals from remote high and low speed transmitters, the combination of a pair of control transformers having stator windings severally connected to said transmitters and corresponding rotor windings for generating an error voltage upon displacement thereof from non-inductive relation with the corresponding stator winding, operative connections between the servo-motor and said rotor windings for driving the latter toward non-inductive relation with the corresponding stator windings, electrical connections between said rotor windings and said servo-motor, and means for shifting control of said servo-motor from one transformer to the other upon loss of a predetermined degree of synchronism between said servo-motor and the transmitter corresponding to said one transformer, said means including an electronic valve interposed between the rotor winding of said other transformer and said servo-motor and having a control electrode connected to the rotor winding of said other transformer for receiving electrical energy therefrom and another electrode connected to energize the servo-motor, electrical blocking means connected to the rotor winding of said other transformer for applying a predetermined control electrode biasing voltage to said electronic valve and for receiving amplified voltage impulses generated by said rotor winding, whereby an error voltage induced in the rotor winding of said other transformer disables said blocking means to enable said other transformer to assume control of said servo-motor, and means responsive to subsequent reduction to a predetermined value of the error voltage induced in the rotor winding of said other transformer for reapplying the blocking voltage to said first valve to restore control to said one transformer.

5. In an electromechanical servo-system having a servo-motor alternately responsive to signals from remote high and low speed transmitters, the combination of a pair of control transformers having stator windings severally connected to said transmitters and corresponding rotor windings for generating an error voltage upon displacement thereof from non-inductive relation with the corresponding stator winding, operative connections between the servo-motor and said rotor windings for driving the latter toward non-inductive relation with the corresponding stator windings, electrical connections between said rotor windings and said servo-motor, and means for shifting control of said servo-motor from one transformer to the other upon loss of a predetermined degree of synchronism between said servo-motor and the transmitter corresponding to said one transformer, said means including an electronic valve interposed between the rotor winding of said other transformer and said servo-motor and having its grid connected to the rotor winding of said other transformer for receiving voltage impulses therefrom and its cathode connected to energize the servo-motor, a second electronic valve having its cathode interposed between the cathode of said first valve and said servo-motor, a source of power connected to the anodes of said valves, means biasing the grid of said second valve to cause application of a predetermined grid biasing voltage across the cathode and grid of said first valve to block the same, whereby induction of error voltage in the rotor winding of said second transformer of sufficient magnitude to unblock said first valve enables said second transformer to assume control of said motor, and means responsive to subsequent reduction to a predetermined value of the error voltage induced in the rotor winding of said other transformer for reapplying the blocking voltage to said first valve to restore control to said one transformer.

6. In an electromechanical servo-system having a servo-motor alternatively responsive to signals from remote high and low speed transmitters, the combination of a pair of control transformers having stator windings severally connected to said transmitters and corresponding rotor windings for generating an error voltage upon displacement thereof from non-inductive relation with the corresponding stator winding, operative connections between the servo-motor and said rotor windings for driving the latter toward non-inductive relation with the corresponding stator windings, electrical connections between said rotor windings and said servo-motor, and means for shifting control of said servo-motor from said high speed transformer to the low speed upon loss of a predetermined degree of synchronism between said servo-motor and the transmitter corresponding to said high speed transformer, said means including an electronic valve interposed between the rotor winding of said low speed transformer and said servo-motor and having one electrode connected to the rotor winding of said low speed transformer for receiving voltage impulses therefrom and another electrode connected to the servo-motor for conveying voltage impulses thereto, and electrical means connected to the rotor winding of said low speed transformer for applying a predetermined blocking voltage to said electronic valve, whereby an error voltage induced in the rotor winding of said low speed transformer disables said blocking means to enable said low speed transformer to assume control of said servo-motor.

7. In an electromechanical servo-system having a servo-motor alternatively responsive to signals from remote high and low speed transmitters, the combination of a pair of control transformers having stator windings severally connected to said transmitters and corresponding rotor windings for generating an error voltage upon displacement thereof from non-inductive relation with the corresponding stator winding, operative connections between the servo-motor and said rotor windings for driving the latter toward non-inductive relation with the corresponding stator windings, electrical connections between said rotor windings and said servo-motor, and means for shifting control of said servo-motor from said high speed transformer to the low speed upon loss of a predetermined degree of synchronism between said servo-motor and the transmitter corresponding to said high speed transformer, said means including an electronic valve interposed between the rotor winding of said low speed transformer and said servo-motor and having its grid connected to the rotor winding of said low speed transformer and its cathode connected to energize the servo-motor, a second electronic valve having its cathode interposed between the cathode of said first valve and said servo-motor, a source of power connected to the anodes of said valves, and means biasing the grid of said second valve to cause application of a predetermined grid biasing voltage to the said first valve to block the same, whereby introduction of an error voltage in the rotor winding of said low speed transformer of sufficient magnitude to unblock said first valve enables said low speed transformer to assume control of said motor.

8. In an electromechanical servo-system having a servo-motor alternatively controlled by at least two similar control transformers having stator windings severally connected to high speed and low speed signal transmission lines and corresponding rotor windings driven toward non-inductive angular position therewith by said servo-motor in response to error voltages generated in said rotor windings, the combination of electronic relay means for shifting control of said servo-motor from one transformer to the other when the error voltage induced in the rotor winding of one of said transformers exceeds a predetermined value as the result of loss of synchronism of the other transformer while controlling said servo-motor, said relay means comprising a normally voltage-blocked electronic valve having a grid connected to the rotor winding of said last named one transformer to receive voltage impulses therefrom and a cathode connected to energize said servo-motor for controlling the same, and a second electronic valve in the circuit of said first valve and responsive to increase in the error voltage impressed on said grid above a predetermined value for unblocking said first valve, whereby the said last-named one transformer assumes control of said servo-motor until the imposition of blocking voltage on said first valve by said second valve in response to a reduction of the error voltage impressed on said grid below said predetermined value.

9. In an electromechanical servo-system having a servo-motor alternatively controlled by at least two similar control transformers having stator windings severally connected to high speed and low speed signal transmission lines and corresponding rotor windings driven toward non-inductive angular position therewith by said servo-motor in response to error voltages generated in said rotor windings, the combination of electronic relay means for shifting control of said servo-motor from one transformer to the other when the error voltage induced in the rotor winding of one of said transformers exceeds a predetermined value as the result of loss of synchronism of the other transformer while controlling said servo-motor, said relay means comprising a normally voltage-blocked electronic valve having a grid connected to the rotor winding of said other transformer for receiving voltage impulses therefrom and a cathode connected to energize said servo-motor for controlling the same, a second electronic valve in the circuit of said first valve and responsive to increase in the error voltage impressed on said grid above a predetermined value for unblocking said first valve, whereby the said other transformer assumes control of said servo-motor until blocking of said first valve by said second valve in response to a reduction of the error voltage impressed on said grid below said predetermined value to thereby enable said one transformer to assume control of said servo-motor, and means responsive to subsequent reduction of the error voltage impressed on said grid below said predetermined value for reapplying blocking voltage to said first valve to thereby restore control to said one transformer.

10. In an electromechanical servo-system having a servo-motor alternatively controlled by at least two similar control transformers having stator windings severally connected to high speed and low speed signal transmission lines and corresponding rotor windings driven toward non-inductive angular position therewith by said servo-motor in response to error voltages generated in said rotor windings, the combination of electronic relay means for shifting control of said servo-motor from said high speed transformer to said low speed transformer when the error voltage induced in the rotor winding of the latter exceeds a predetermined value as the result of loss of synchronism of the high speed transformer while controlling said servo-motor, said relay means comprising a normally voltage-blocked electronic valve having a grid connected to the rotor winding of said low speed transformer to receive voltage impulses therefrom and a cathode connected to energize said servo-motor for controlling the same, and a second electronic valve in the circuit of said first valve and responsive to increase in the error voltage impressed on said grid above a predetermined value for unblocking said first valve, whereby the said low speed transformer assumes control of said servo-motor until the imposition of blocking on said first valve by said second valve in response to a reduction of the error voltage impressed on said grid below said predetermined value.

11. In an electromechanical servo-system having a servo-motor alternatively controlled by at least two similar control transformers having stator windings severally connected to high speed and low speed signal transmission lines and corresponding rotor windings driven toward non-inductive angular position therewith by said servo-motor in response to error voltages generated in said rotor windings, the combination of electronic relay means for shifting control of said servo-motor from said high speed transformer to said low speed transformer when the error voltage induced in the rotor winding of the latter exceeds a predetermined value as the result of loss of synchronism of the high speed transformer while controlling said servo-motor, said relay means comprising a normally voltage-blocked electronic valve having a grid connected to the rotor winding of said low speed transformer for receiving voltage impulses therefrom and a cathode connected to energize said servo-motor for controlling the same, a second electronic valve in the circuit of said first valve and responsive to increase in the error voltage impressed on said grid above a predetermined value for unblocking said first valve to thereby enable said low speed transformer to assume control of said servo-motor, and means responsive to subsequent reduction of the error voltage impressed on said grid below said predetermined value for reapplying blocking voltage to said first valve to thereby restore control to said high speed transformer.

WILMER C. ANDERSON.

REFERENCES CITED

The following references are of record in the file of this patent:

UNITED STATES PATENTS

| Number | Name | Date |
|---|---|---|
| 2,407,876 | Godet | Sept. 17, 1946 |
| 2,409,970 | Agins | Oct. 22, 1946 |
| 2,414,384 | Moseley | Jan. 14, 1947 |
| 2,446,532 | Edwards | Aug. 10, 1948 |